(12) United States Patent
Mihara

(10) Patent No.: US 10,221,606 B2
(45) Date of Patent: Mar. 5, 2019

(54) FLUID DAMPER DEVICE, APPARATUS WITH DAMPER AND WESTERN-STYLE TOILET UNIT

(71) Applicant: NIDEC SANKYO CORPORATION, Suwa-gun, Nagano (JP)

(72) Inventor: Naoya Mihara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/497,331

(22) Filed: Apr. 26, 2017

(65) Prior Publication Data
US 2017/0314311 A1 Nov. 2, 2017

(30) Foreign Application Priority Data

Apr. 27, 2016 (JP) ................................ 2016-088745

(51) Int. Cl.
| | |
|---|---|
| *E05F 5/02* | (2006.01) |
| *A47K 13/12* | (2006.01) |
| *F16F 9/32* | (2006.01) |
| *A47K 13/02* | (2006.01) |
| *E03D 1/00* | (2006.01) |

(52) U.S. Cl.
CPC ............. *E05F 5/02* (2013.01); *A47K 13/12* (2013.01); *F16F 9/3207* (2013.01); *A47K 13/02* (2013.01); *E03D 1/00* (2013.01); *F16F 2222/12* (2013.01); *F16F 2232/02* (2013.01)

(58) Field of Classification Search
CPC ....... A47K 13/12; A47K 13/02; F16F 9/3207; E03D 1/00

USPC ............................................................. 4/240
See application file for complete search history.

(56) References Cited

U.S. PATENT DOCUMENTS

| 5,152,189 A * | 10/1992 | Miura .................... F16F 9/145 464/180 |
| 5,768,718 A * | 6/1998 | Sorimachi ............ A47K 13/12 4/236 |
| 7,798,296 B2 * | 9/2010 | Iwashita ................ F16F 9/145 188/290 |
| 8,555,427 B2 * | 10/2013 | Stauber ............... A47K 13/305 4/236 |
| 2003/0126717 A1 * | 7/2003 | Iwashita ............... A47K 13/10 16/82 |

(Continued)

FOREIGN PATENT DOCUMENTS

JP        2015194230 A        11/2015

*Primary Examiner* — Benjamin R Shaw
(74) *Attorney, Agent, or Firm* — Cantor Colburn LLP

(57) ABSTRACT

A fluid damper device may include a tube-shaped case with a bottom wall, a tube part and a partitioning protruded part protruded from the tube part, a turning shaft provided with a body part which faces a first end face of the partitioning protruded part and a flange part enlarged to an outer side in the radial direction from the body part and faces a second end face of the partitioning protruded part, a valve body supported on an outer side of the body part, and fluid filled on an inner side of the case. A face of the flange part is provided with a first region structured to contact the partitioning protruded part and a second region where a distance between the second end face and the flange part is set to be wider than the first region along one direction in a circumferential direction.

13 Claims, 8 Drawing Sheets

(56) References Cited

U.S. PATENT DOCUMENTS

| | | | | |
|---|---|---|---|---|
| 2006/0027432 A1* | 2/2006 | Araki | ............ | F16F 9/145 188/290 |
| 2008/0253893 A1* | 10/2008 | Nishiyama | ............ | F16F 9/145 416/169 R |
| 2010/0205774 A1* | 8/2010 | Yoshida | ............ | A47K 13/12 16/250 |
| 2012/0252590 A1* | 10/2012 | Yonezawa | ............ | F16F 9/145 464/180 |
| 2014/0102840 A1* | 4/2014 | Cho | ............ | F16F 9/145 188/281 |
| 2014/0190779 A1* | 7/2014 | Horita | ............ | F16F 9/145 188/282.1 |
| 2014/0345992 A1* | 11/2014 | Hu | ............ | F16F 9/145 188/293 |
| 2015/0008082 A1* | 1/2015 | Sakuta | ............ | F16F 9/12 188/296 |
| 2015/0014105 A1* | 1/2015 | Sakuta | ............ | F16F 9/52 188/296 |
| 2015/0265110 A1* | 9/2015 | Chen | ............ | A47K 13/26 4/240 |
| 2017/0114855 A1* | 4/2017 | Mihara | ............ | F16F 9/145 |
| 2017/0130795 A1* | 5/2017 | Mihara | ............ | F16F 9/145 |

\* cited by examiner

FLUID DAMPER DEVICE, APPARATUS WITH DAMPER AND WESTERN-STYLE TOILET UNIT

CROSS REFERENCE TO RELATED APPLICATION

The present invention claims priority under 35 U.S.C. § 119 to Japanese Application No. 2016-088745 filed Apr. 27, 2016, the entire content of which is incorporated herein by reference.

FIELD OF THE INVENTION

At least an embodiment of the present invention may relate to a fluid damper device in which fluid is filled between a case and a rotor, an apparatus with a damper and a Western-style toilet unit.

BACKGROUND

In a fluid damper device, a turning shaft is disposed on an inner side of a case and fluid such as oil is filled in a damper chamber between the turning shaft and the case. A partitioning protruded part is protruded to an inner side in a radial direction from a tube part of the case and valve bodies are supported on an outer peripheral side of the turning shaft. Further, a first end face which is an end face on an inner side in the radial direction of the partitioning protruded part and a body part of the turning shaft are faced each other in the radial direction, and a second end face which is one of end faces in an axial line direction of the partitioning protruded part faces a flange part of the turning shaft in the axial line direction, and the other of the end faces in the axial line direction of the turning shaft and a bottom wall of the case are faced each other. Therefore, in a structure that the first end face of the partitioning protruded part and the body part of the turning shaft are contacted with each other, the second end face of the partitioning protruded part and the flange part of the turning shaft are contacted with each other, and the other of the end faces in the axial line direction of the turning shaft and the bottom wall of the case are contacted with each other, when the turning shaft is turned in a direction in which the valve body is set in a closed state, the fluid is compressed between the valve body and the partitioning protruded part and thus a large load is applied to the turning shaft. On the other hand, when the turning shaft is turned in a direction in which the valve body is set in an open state, the fluid is passed the valve body and thus a large load is not applied to the turning shaft (see Japanese Patent Laid-Open No. 2015-194230).

However, in a case that a gap space between the turning shaft and the case is reduced, for example, in a state that the second end face of the partitioning protruded part and the flange part of the turning shaft are always contacted with each other, a large sliding resistance is always occurred between the turning shaft and the case. The sliding resistance is applied to the turning shaft as an unnecessary load even when the turning shaft is turned in a direction that the valve body is set in an open state and thus it is not preferable. Further, the sliding resistance causes occurrence of wear and the like on a sliding portion between the turning shaft and the case.

SUMMARY

In view of the problem described above, at least an embodiment of the present invention may advantageously provide a fluid damper device which is capable of reducing an unnecessary sliding resistance between a turning shaft and a case, an apparatus with a damper and a Western-style toilet unit.

According to at least an embodiment of the present invention, there may be provided a fluid damper device including a tube shaped case provided with a bottom wall, a tube part extended to one side in an axial line direction from the bottom wall, and a partitioning protruded part protruded to an inner side in a radial direction from an inner peripheral face of the tube part, a turning shaft which is provided with a body part, which faces a first end face of the partitioning protruded part that is an end face on the inner side in the radial direction, and a flange part which is enlarged to an outer side in the radial direction from the body part and faces a second end face of the partitioning protruded part that is an end face on one side in the axial line direction, a valve body which is supported on an outer side in the radial direction of the body part, and fluid which is filled on an inner side of the case. A face of the flange part on a side of the body part is provided with a first region capable of contacting with the partitioning protruded part and a second region where a distance between the second end face and the flange part is set to be wider than a distance of the first region along one direction in a circumferential direction.

In at least an embodiment of the present invention, a flange part of the turning shaft which faces a second end face on one side in an axial line direction of the partitioning protruded part of the case is provided with a first region capable of contacting with the partitioning protruded part and a second region where a distance between the second end face and the flange part is set to be wider than a distance of the first region along one direction in a circumferential direction. Therefore, when the turning shaft is turned so that the partitioning protruded part is passed through the second region, an unnecessary sliding resistance generated between the second end face of the partitioning protruded part and the flange part of the turning shaft can be reduced or eliminated. Accordingly, an occurrence of a situation that an unnecessary load is applied to the turning shaft due to sliding resistance can be restrained, and an occurrence of a situation that wear is occurred in a sliding portion between the turning shaft and the case (the flange part and the second end face of the partitioning protruded part) can be restrained. Further, the second region configured to reduce sliding resistance is provided in a part of the region in the circumferential direction. Therefore, in the turnable range of the turning shaft, the first region can be provided over an angular range where a load is required to be applied to the turning shaft, and the second region can be provided over an angular range where a load is not required to be applied to the turning shaft. Accordingly, damper performance of the fluid damper device is not deteriorated.

In at least an embodiment of the present invention, the one direction in the circumferential direction is a turning direction of the turning shaft in which the valve body is set in a closed state. In at least an embodiment of the present invention, the second region is provided over the whole in a radial direction over an angular range of the second region in the flange part. According to this structure, a sliding resistance can be largely reduced when the partitioning protruded part is passed through the second region.

In at least an embodiment of the present invention, in the first region, a distance between the second end face and the flange part is constant over the whole in the circumferential direction and, in the second region, a distance between the second end face and the flange part is constant over the whole in the circumferential direction.

In at least an embodiment of the present invention, a boundary between the first region and the second region is formed to be an inclined face or a curved face so that a distance between the second end face and the flange part is varied continuously. According to this structure, an occurrence of a situation that the partitioning protruded part is caught at the boundary between the first region and the second region can be restrained.

In at least an embodiment of the present invention, the second end face is provided with a rib which is protruded toward the flange part and is extended in the radial direction. According to this structure, in a state that the second end face and the flange part are required to be contacted with each other, a gap space in the axial line direction between the partitioning protruded part and the flange part of the turning shaft is reduced and the contact state can be secured. Further, even in a case that the height (protruding dimension) of the rib is too high, the rib is squeezed when the fluid damper device is assembled and the height of the rib becomes appropriate. Therefore, in a case that the contact state is required, when the turning shaft is turned in a direction so that the valve body is set in a closed state, a situation is hard to occur that the fluid is passed through a space between the partitioning protruded part and the flange part of the turning shaft to leak in the circumferential direction. Accordingly, reduction and variation of a load at the time of turning of the turning shaft can be restrained.

In at least an embodiment of the present invention, the first end face is provided with a rib which is protruded toward the body part and is extended in the axial line direction. According to this structure, in a state that the first end face and the body part is required to be contacted with each other, a gap space in a radial direction between the partitioning protruded part and the body part of the turning shaft is reduced and the contact state can be secured. Further, even in a case that the height (protruding dimension) of the rib is too high, the rib is squeezed when the fluid damper device is assembled and the height of the rib becomes appropriate. Therefore, when the turning shaft is turned in a direction so that the valve body is set in a closed state, a situation is hard to occur that the fluid is passed through a gap space between the partitioning protruded part and the body part of the turning shaft to leak in the circumferential direction. Accordingly, reduction and variation of a load at the time of turning of the turning shaft can be restrained.

In at least an embodiment of the present invention, an end face on the other side in the axial line direction of the turning shaft is provided with a rib which is protruded toward the bottom wall and is extended in the radial direction. According to this structure, a gap space in the axial line direction between the bottom wall of the case and the end face of the turning shaft is reduced and the contact state can be secured. Further, even in a case that the height (protruding dimension) of the rib is too high, the rib is squeezed when the fluid damper device is assembled and the height of the rib becomes appropriate. Therefore, when the turning shaft is turned in a direction so that the valve body is set in a closed state, a situation is hard to occur that the fluid is passed through a gap space between the bottom wall of the case and the end face of the turning shaft to leak in the circumferential direction. Accordingly, reduction and variation of a load at the time of turning of the turning shaft can be restrained.

In at least an embodiment of the present invention, an outer peripheral face of the body part is provided with a first peripheral face and a second peripheral face having a radius smaller than a radius of the first peripheral face in this order along one direction in the circumferential direction. According to this structure, when the turning shaft is turned and the partitioning protruded part passes a region facing the second peripheral face, a sliding resistance generated between the first end face of the partitioning protruded part and the outer peripheral face of the body part of the turning shaft can be reduced or eliminated. Therefore, an occurrence of a situation that an unnecessary load due to a sliding resistance is applied to the turning shaft can be restrained, and an occurrence of a situation that wear is occurred in a sliding portion between the turning shaft and the case (the body part of the turning shaft and the first end face of the partitioning protruded part) can be restrained. Further, the second peripheral face configured to reduce a sliding resistance is provided in a part of the region in the circumferential direction. Therefore, in the turnable range of the turning shaft, the first peripheral face can be provided over an angular range where a load is required to be applied to the turning shaft, and the second peripheral face can be provided over an angular range where a load is not required to be applied to the turning shaft. Accordingly, damper performance of the fluid damper device is not deteriorated.

In an apparatus with a damper including the fluid damper device in accordance with at least an embodiment of the present invention, a swing member is attached to an apparatus main body through the fluid damper device. For example, in a case that an apparatus with a damper is a Western-style toilet unit, a toilet seat is attached to a toilet bowl main body through the fluid damper device.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment to which the present invention is applied will be described below with reference to the accompanying drawings. In the following descriptions, in an axial line "L" direction of a turning shaft 40, a side to which the turning shaft 40 is protruded is referred to as one side "L1" and an opposite side to the side where the turning shaft 40 is protruded is referred to as the other side "L2".

(Entire Structure of Apparatus with Damper and Fluid Damper Device 10)

Figure 1:
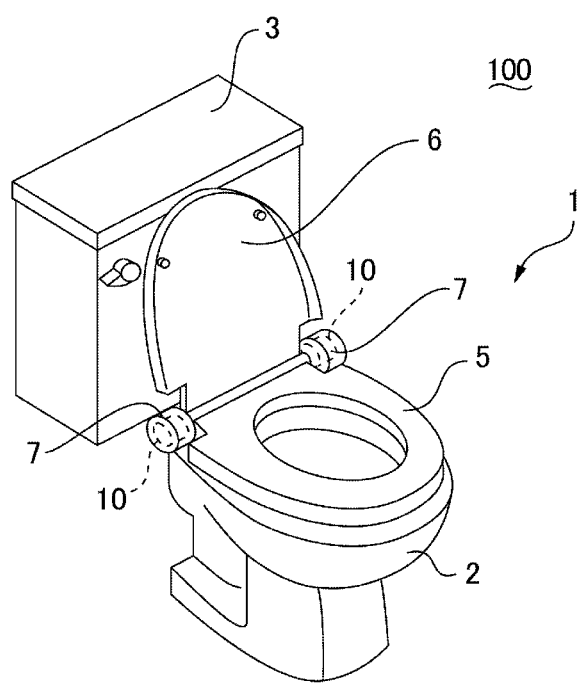
FIG. 1 is an explanatory view showing a Western-style toilet unit on which a fluid damper device to which the present invention is applied is mounted.
Figure 2A:
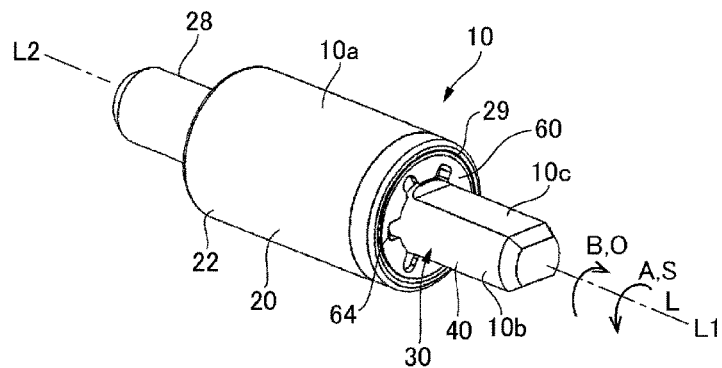
FIGS. 2A and 2B are explanatory views showing a fluid damper device to which the present invention is applied and which is viewed from one side in its axial line direction.
Figure 2B:
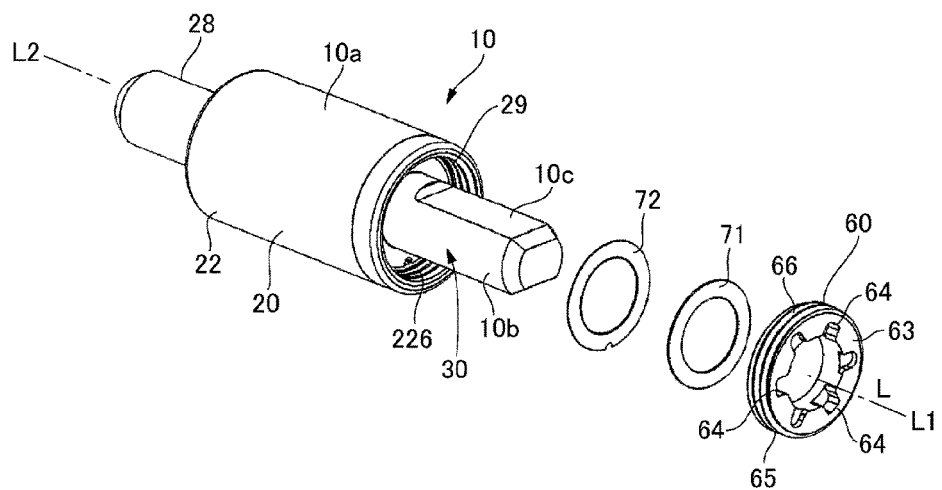

FIG. 1 is an explanatory view showing a Western-style toilet unit 100 on which a fluid damper device 10 to which at least an embodiment of the present invention is applied is mounted. FIGS. 2A and 2B are explanatory views showing the fluid damper device 10 to which at least an embodiment of the present invention is applied and which is viewed from one side "L1" in the axial line "L" direction. FIG. 2A is a perspective view showing the fluid damper device 10 and FIG. 2B is an exploded perspective view showing the fluid damper device 10 in which a cover 60 and the like are detached from a case 20.

The Western-style toilet unit 100 shown in FIG. 1 includes a Western-style toilet bowl 1 (apparatus with a damper) and a water tank 3. The Western-style toilet bowl 1 includes a toilet bowl main body 2 (apparatus main body), a toilet seat 5 (swing member) made of resin, a toilet cover 6 (swing member) made of resin, a unit cover 7 and the like. Fluid damper devices for a toilet seat and a toilet cover described below are incorporated in an inside of the unit cover 7, and the toilet seat 5 and the toilet cover 6 are respectively connected with the toilet bowl main body 2 through the fluid damper devices.

As shown in FIGS. 2A and 2B, the fluid damper device 10 includes a fluid damper device main body 10a in a cylindrical shape. A shaft-shaped connecting part 10b is protruded to one side "L1" from the fluid damper device main body 10a. The connecting part 10b is connected with the swing member such as the toilet seat 5 and the toilet cover 6. The fluid damper device 10 generates a resisting force (load) to reduce a falling-down speed of the toilet seat 5 or the toilet cover 6 when the toilet seat 5 or the toilet cover 6 in a stood-up state is going to fall down so as to cover the toilet bowl main body 2. The connecting part 10b is formed with two opposed faces formed in a flat face 10c, and the toilet seat 5 and the toilet cover 6 are prevented by the flat faces 10c from being idly turned with respect to the connecting part 10b. The fluid damper device 10 connected with the toilet seat 5 and the fluid damper device 10 connected with the toilet cover 6 may be structured the same as each other and thus, in the following descriptions, the fluid damper device 10 connected with the toilet seat 5 will be mainly described below.

(Structure of Fluid Damper Device 10)

Figure 3A:
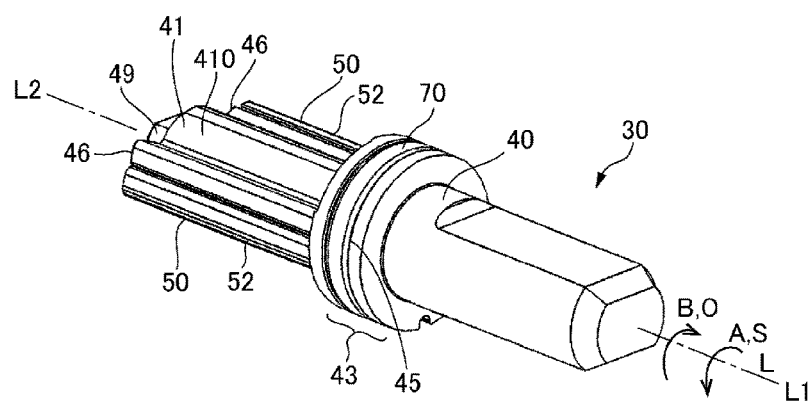
FIGS. 3A and 3B are explanatory views showing a rotor of the fluid damper device shown in FIGS. 2A and 2B which is viewed from one side in its axial line direction.
Figure 3B:
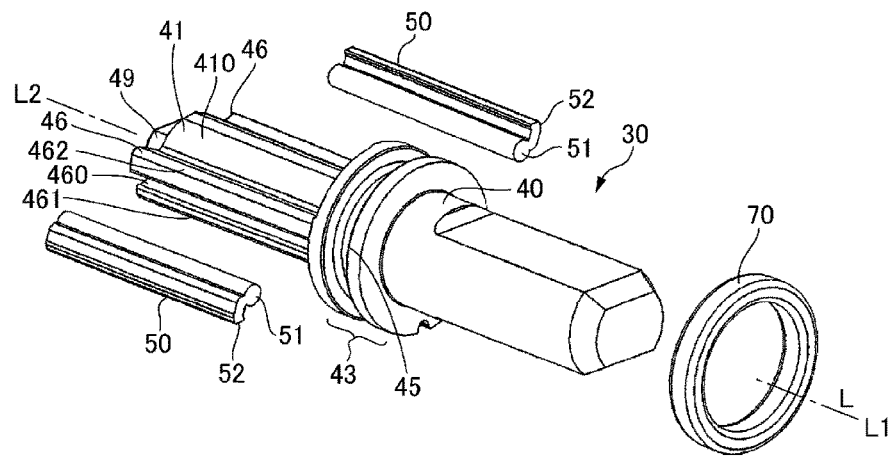
Figure 4A:
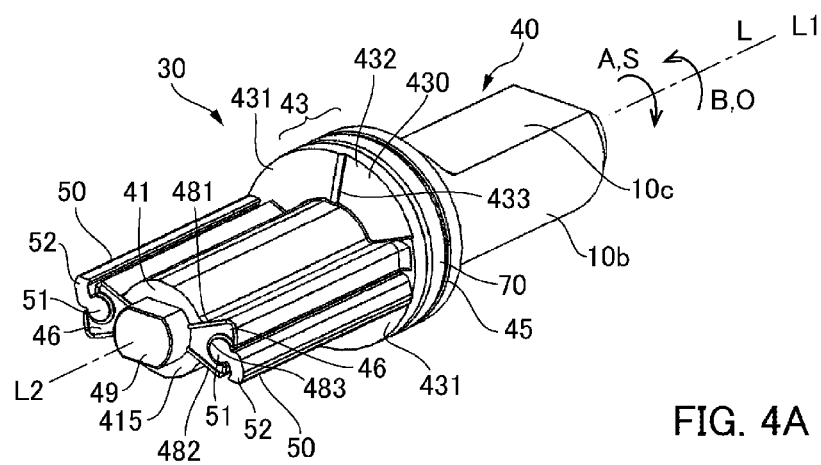
FIGS. 4A and 4B are explanatory views showing the rotor shown in FIGS. 3A and 3B which is viewed from the other side in the axial line direction.
Figure 4B:
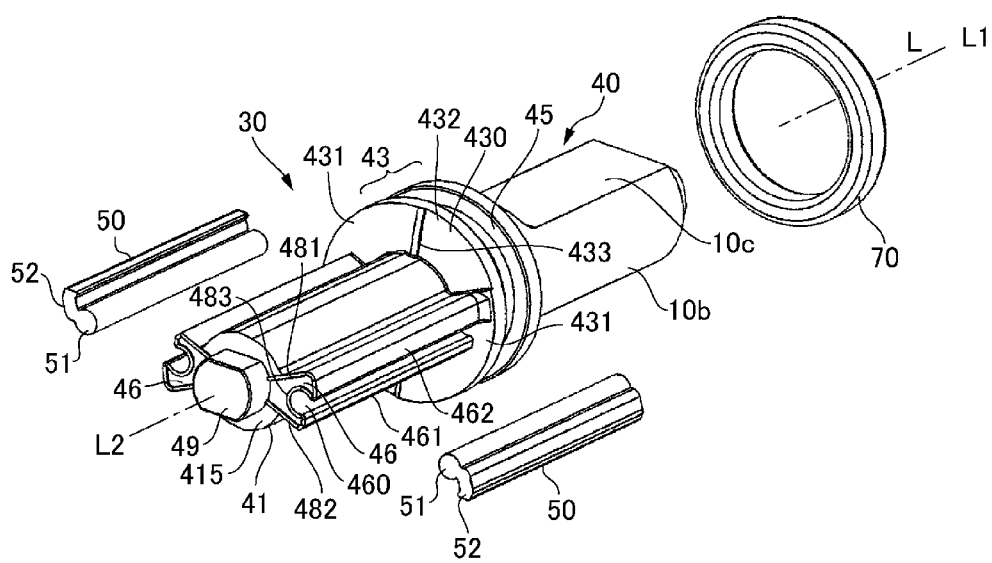
Figure 5A:
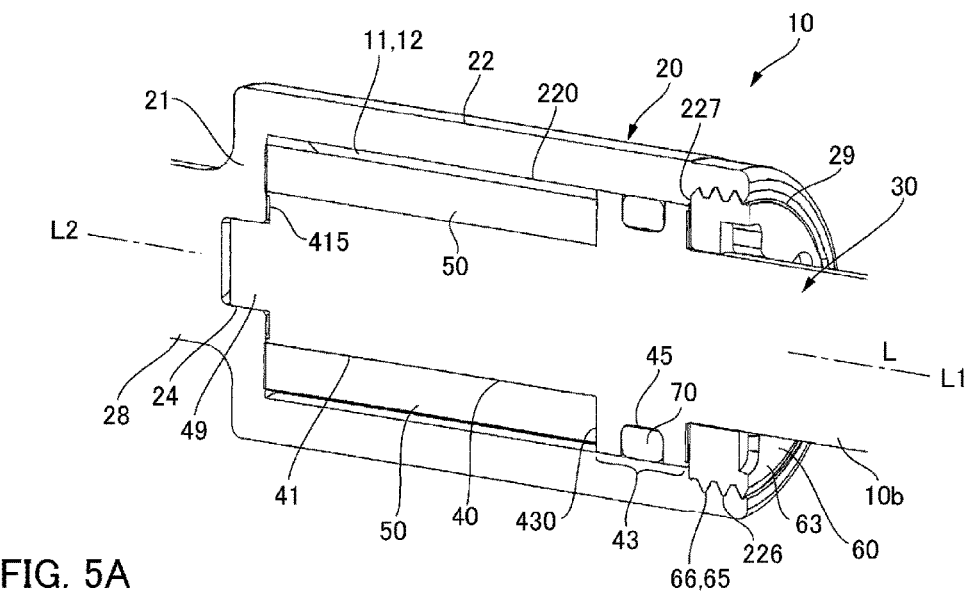
FIGS. 5A and 5B are cross-sectional views showing the fluid damper device in FIGS. 2A and 2B which is cut in a direction along its axial line.
Figure 5B:
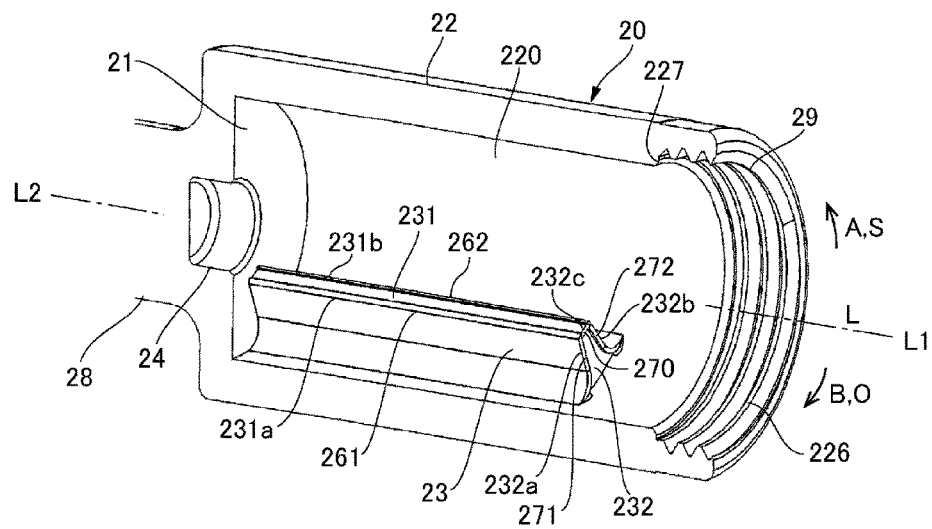
Figure 6A:
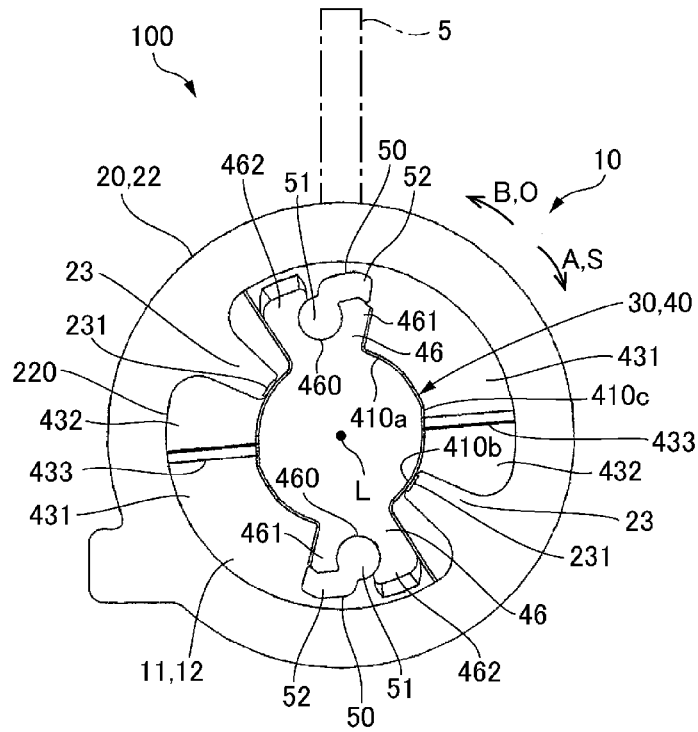
FIGS. 6A and 6B are cross-sectional views showing the fluid damper device in FIGS. 2A and 2B which is cut in a direction perpendicular to the axial line and is viewed from the other side in the axial line direction.
Figure 6B:
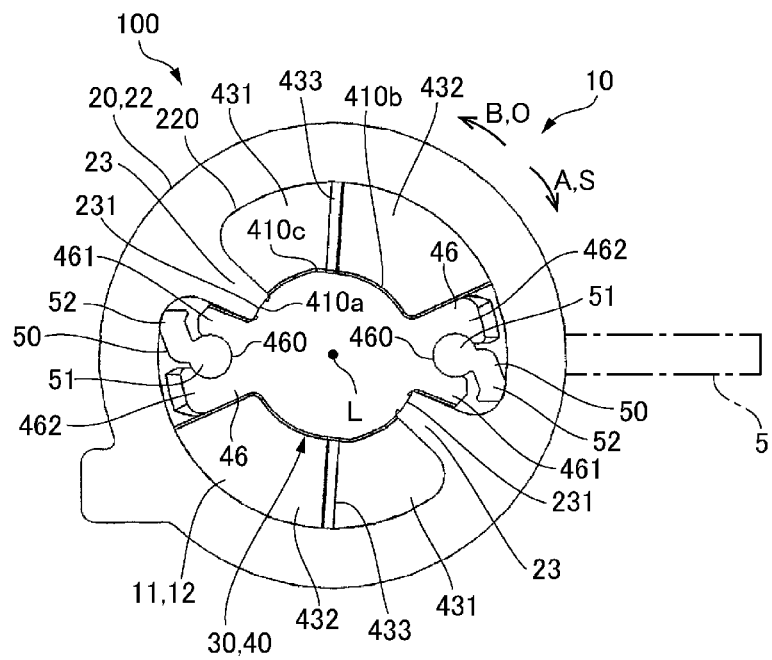

FIGS. 3A and 3B are explanatory views showing a rotor 30 of the fluid damper device 10 shown in FIGS. 2A and 2B which is viewed from one side "L1" in the axial line "L" direction. FIG. 3A is a perspective view showing a rotor 30 and FIG. 3B is an exploded perspective view showing the rotor 30. FIGS. 4A and 4B are explanatory views showing the rotor 30 shown in FIGS. 3A and 3B which is viewed from the other side "L2" in the axial line "L" direction. FIG. 4A is a perspective view showing the rotor 30 and FIG. 4B is an exploded perspective view showing the rotor 30. FIGS. 5A and 5B are cross-sectional views showing the fluid damper device 10 in FIGS. 2A and 2B which is cut in a direction along the axial line "L". FIG. 5A is a cross-sectional view showing the fluid damper device main body 10a and FIG. 5B is a cross-sectional view showing a case 20. FIGS. 6A and 6B are cross-sectional views showing the fluid damper device 10 shown in FIGS. 2A and 2B which is cut in a direction perpendicular to the axial line "L" and is viewed from the other side "L2" in the axial line "L" direction. FIG. 6A is a cross-sectional view when the toilet seat 5 is stood up and FIG. 6B is a cross-sectional view when the toilet seat 5 has been fallen down.

As shown in FIGS. 2A through 6B, the fluid damper device 10 includes a tube-shaped case 20 provided with a bottom wall 21 on the other side "L2" in the axial line "L" direction, a rotor 30 whose other side "L2" is disposed on an inner side of the case 20, and a ring-shaped cover 60 which closes an opening 29 of the case 20 on one side "L1".

As shown in FIGS. 2A and 2B, FIGS. 5A and 5B, and FIGS. 6A and 6B, the case 20 is provided with a tube part 22 in a cylindrical tube shape which is extended to one side "L1" from the bottom wall 21, and two partitioning protruded parts 23 which are protruded to an inner side in a radial direction from an inner peripheral face 220 of the tube part 22. The case 20 is made of resin. The two partitioning protruded parts 23 are formed at angular positions displaced by 180° from each other in a circumferential direction. An end part on the other side "L2" of each of the two partitioning protruded parts 23 is connected with the bottom wall 21. The partitioning protruded part 23 is formed in a substantially trapezoid shape in cross section and its dimension in a circumferential direction (thickness) becomes thinner to an inner side from an outer side in the radial direction. In this embodiment, the case 20 is formed with a connecting part 28 in a cylindrical tube shape which is protruded to the other side "L2" from the bottom wall 21. The connecting part 28 is fixed to an apparatus main body such as the toilet bowl main body 2.

As shown in FIGS. 3A through 6B, the rotor 30 is provided with a turning shaft 40 whose other side "L2" in the axial line "L" direction is disposed on an inner side of the case 20 and valve bodies 50 which are held on an outer peripheral side of the turning shaft 40. The turning shaft 40 is made of resin and is provided with a body part 41 located on an inner side of the case 20, a connecting part 10b extended to one side "L1" from the body part 41, and an end part 49 protruded to the other side "L2" from the body part 41. An outer diameter of the body part 41 is larger than that of the end part 49 and an outer diameter of the connecting part 10b is larger than that of the body part 41. In accordance with an embodiment of the present invention, an outer diameter of the connecting part 10b may be smaller than that of the body part 41.

A circular plate-shaped flange part 43 whose diameter is enlarged on one side "L1" of the body part 41 is formed between the body part 41 and the connecting part 10b of the turning shaft 40. A ring-shaped circumferential groove 45 is formed on an outer peripheral face of the flange part 43. Therefore, when an O-ring 70 is mounted on the circumferential groove 45 and the body part 41 of the turning shaft 40 is disposed on an inner side of the case 20, the O-ring 70 is abutted with an inner peripheral face 220 of the tube part 22 of the case 20 and a space sectioned between the bottom wall 21 of the case 20 and the flange part 43 of the turning shaft 40 is sealed as a damper chamber 11 between the case 20 and the rotor 30. In this case, fluid 12 (viscous fluid) such as oil is filled in the damper chamber 11. After that, when the cover 60 is fixed to the case 20, the fluid damper device 10 is completed.

In this state, first end faces 231 which are end faces on an inner side in the radial direction of the two partitioning protruded parts 23 of the case 20 are protruded toward the body part 41 of the turning shaft 40, and the first end faces 231 and the outer peripheral face 410 of the body part 41 are faced each other in the radial direction. Further, second end faces 232 which are end faces on one side "L1" in the axial line "L" direction of the two partitioning protruded parts 23 of the case 20 and the flange part 43 of the turning shaft 40 are faced each other in the axial line "L" direction. Further, an end face 415 on the other side "L2" of the turning shaft 40 and the bottom wall 21 of the case 20 are faced each other in the axial line "L" direction.

As shown in FIGS. 2A and 2B and FIGS. 5A and 5B, in order to fix the cover 60 to the case 20, a male screw 66 is formed on an outer peripheral face 65 of the cover 60 and a female screw 226 is formed on an inner peripheral face 220 of the case 20 in a portion which is adjacent to the opening 29 of the case 20. Therefore, the cover 60 can be fixed to an inner side of the case 20 by the female screw 226 and the male screw 66. An end face 63 on one side "L1" of the cover 60 is formed with recessed parts 64 at a plurality of positions in a circumferential direction. In this embodiment, the recessed part 64 is provided at three positions in the circumferential direction on an inner peripheral edge of the end face 63 on one side "L1" of the cover 60. When the cover 60 is to be screwed, the recessed parts 64 are engaged with a jig (not shown) and the cover 60 is turned.

The inner peripheral face 220 of the case 20 is provided with a ring-shaped step part 227 which is formed by setting so that an inner diameter of a portion located on one side "L1" is larger than an inner diameter of a portion located on the other side "L2". Therefore, when the cover 60 is fixed to the case 20, an inserting amount of the cover 60 into the case 20 is restricted by abutting the cover 60 with the step part 227. In this state, a part of the connecting part 10b is penetrated through the cover 60 and the connecting part 10b is turnably supported on an inner side of the cover 60. Further, the end part 49 on the other side "L2" of the turning shaft 40 is turnably supported by a recessed part 24 which is formed in the bottom wall 21 of the case 20.

According to the fixing structure of the cover 60, fixed strength of the cover 60 to the case 20 is high and the cover 60 can be fixed to the case 20 appropriately. Therefore, even when pressure within the damper chamber 11 is excessively increased, a situation that the cover 60 is pushed out to an outer side is prevented. Further, even when a dimension of the cover 60 is varied, an inserting amount of the cover 60 into the case 20 is hard to be varied and thus the cover 60 can be fixed to the case 20 appropriately. Therefore, a situation that an inserting amount of the cover 60 into the case 20 is varied and a volume of the damper chamber 11 is varied is hard to be occurred and thus a damper performance is hard to be varied. Further, the whole in the axial line "L" direction of the outer peripheral face 65 of the cover 60 is formed with the male screw 66. Therefore, the entire cover 60 can be screwed to the case 20 and, in a state that the cover 60 is screwed to the case 20, the entire cover 60 is located inside the case 20. Therefore, a dimension in the axial line "L" direction of the fluid damper device 10 can be reduced. Further, since the entire cover 60 can be screwed to the case 20, the cover 60 can be firmly fixed to the case 20. In this embodiment, turning prevention processing is performed between the cover 60 and the case 20. For example, adhesion processing, caulking processing, ultrasonic wave welding or the like is utilized as the turning prevention processing. Therefore, when the turning shaft 40 is turned, the cover 60 can be prevented from being turned and fixing of the cover 60 to the case 20 is prevented from being loosened. In this embodiment, a circular ring-shaped washer 71 and a circular ring-shaped spacer 72 are disposed between the flange part 43 of the turning shaft 40 and the cover 60 and thus the cover 60 is abutted with the flange part 43 through the washer 71 and the spacer 72.

(Structure in Damper Chamber 11)

As shown in FIGS. 3A and 3B, FIGS. 4A and 4B and FIGS. 6A and 6B, two valve body support parts 46 are protruded to an outer side in the radial direction from the outer peripheral face 410 of the body part 41 of the turning shaft 40 at angular positions displaced by 180° in a circumferential direction. A valve body 50 is supported by each of the two valve body support parts 46. Each of the two valve body support parts 46 is extended toward one side "L1" to the flange part 43 with an end part on the other side "L2" of the body part 41 as a starting point. Both end parts on one side "L1" of the two valve body support parts 46 are connected with the flange part 43.

An outer side portion in the radial direction of the valve body support part 46 is formed with a first protruded part 461 protruded to an outer side in the radial direction and a second protruded part 462 which is protruded to the outer side in the radial direction at a position adjacent to the first protruded part 461 on the second direction "B" side (open direction "O" side of the toilet seat 5). A groove 460 is formed between the first protruded part 461 and the second protruded part 462. An end part on one side "L1" of each of the first protruded part 461 and the second protruded part 462 is connected with the flange part 43.

An inner peripheral face of the groove 460 is formed in a circular arc shape which is curved over an angular range of 180° or more. The valve body 50 is supported by the groove 460. In this embodiment, a tip end part of the first protruded part 461 is located on an inner side in the radial direction with respect to a tip end part of the second protruded part 462. Further, the first protruded part 461 and the second protruded part 462 are protruded in directions separated from each other toward the tip end sides and a width in a circumferential direction of the valve body support part 46 becomes narrower on its inner side in the radial direction than its outer side in the radial direction.

The valve body 50 is made of resin and is provided with a first end part 51 in a substantially circular shape in cross section, which is turnably supported by the groove 460 around an axial line parallel to the axial line "L" on an inner side in the radial direction, and a second end part 52 protruded to an outer side in the radial direction from the first end part 51. The first end part 51 is swingably supported by the groove 460 of the valve body support part 46 around the axial line of the first end part 51, and the second end part 52 is inclined toward the first direction "A" side (closing direction "S" of the toilet seat 5) so as to cover the first protruded part 461. A tip end part of the second end part 52 is located on an outer side in the radial direction with respect to the first protruded part 461 and the second protruded part 462.

(Structure of Body Part 41 of Turning Shaft 40)

A radius of an outer peripheral face 410 of the body part 41 of the turning shaft 40 is different in its circumferential direction so that, when the rotor 30 is turned around the axial line "L", in a predetermined angular range, the first end face 231 of the partitioning protruded part 23 is contacted with the outer peripheral face 410 of the body part 41 of the turning shaft 40 and, in another angular range, a gap space is formed between the first end face 231 of the partitioning protruded part 23 and the outer peripheral face 410 of the body part 41 of the turning shaft 40.

In this embodiment, the radius of the outer peripheral face 410 of the body part 41 is set in two dimensions in the circumferential direction and thus, the outer peripheral face 410 of the body part 41 of the turning shaft 40 is provided in the circumferential direction with two circular arc faces in a concentric shape (first peripheral face 410a and second peripheral face 410b) whose radii of curvature are different from each other. In this embodiment, when the valve body support part 46 is the reference, the first peripheral face 410a is provided so as to be located over an angular range of about 0° through about 45° along the first direction "A", and the second peripheral face 410b is provided so as to be located over an angular range of about 60° through 120°. The radius of curvature of the second peripheral face 410b is smaller than that of the first peripheral face 410a. Further, a radius of curvature of a boundary face 410c located over an angular range of about 45° through 60° becomes continuously smaller from the first peripheral face 410a to the second peripheral face 410b.

Therefore, when the turning shaft 40 is turned around the axial line "L" and the first peripheral face 410a is reached to an angular position where the partitioning protruded part 23 is provided, the first end face 231 of the partitioning protruded part 23 is contacted with the first peripheral face 410a of the body part 41 of the turning shaft 40. On the other hand, when the second peripheral face 410b is reached to an angular position where the partitioning protruded part 23 is provided, a gap space is formed between the first end face 231 of the partitioning protruded part 23 and the second peripheral face 410b of the body part 41 of the turning shaft 40.

(Damper Operation)

As shown in FIG. 6A, when the toilet seat 5 is located in an upright stood-up attitude, the first end face 231 of the partitioning protruded part 23 and the outer peripheral face 410 of the body part 41 of the turning shaft 40 are not contacted with each other in the fluid damper device 10 and set in a non-contact state. In this state, when the toilet seat 5 starts a turning operation in the closing direction "S" so as to turn toward a falling-down attitude, the rotor 30 is turned in the first direction "A" around the axial line "L". Therefore, the valve body 50 is turned by receiving pressure from the fluid 12 and the second end part 52 is turned to a closed state where the second end part 52 is moved toward a side of the second protruded part 462. In the closed state, the second end part 52 of the valve body 50 is abutted with the inner peripheral face 220 of the tube part 22 of the case 20. Therefore, movement of the fluid 12 is prevented between the valve body 50 and the tube part 22.

However, while the second peripheral face 410b is located at an angular position where the partitioning protruded part 23 is provided, a gap space is provided between the partitioning protruded part 23 and the body part 41 of the turning shaft 40 and thus the fluid 12 is passed through the gap space between the partitioning protruded part 23 and the body part 41. Therefore, a load applied to the rotor 30 is small. In this case, a turning force of the toilet seat 5 due to gravity which is applied to the toilet seat 5 toward the falling-down attitude is small and thus the falling-down speed of the toilet seat 5 is slow. Further, the body part 41 of the turning shaft 40 is turned in a separated state from the first end face 231 of the partitioning protruded part 23 and thus wear is hard to be occurred between the first end face 231 of the partitioning protruded part 23 and the body part 41.

Next, the toilet seat 5 is further turned in the closing direction "S" and, when the rotor 30 is further turned in the first direction "A" around the axial line "L", the partitioning protruded part 23 is contacted with the first peripheral face 410a of the body part 41 of the turning shaft 40 as shown in FIG. 6B. Therefore, the fluid 12 does not pass through between the partitioning protruded part 23 and the body part 41 and thus a large load is applied to the rotor 30. Accordingly, even in a case that a turning force applied to the toilet seat 5 by gravity toward the falling-down attitude becomes large, the falling-down speed of the toilet seat 5 is slow. Even in this case, a slight gap space is existed between the rotor 30 and the case 20 and thus the fluid 12 is slightly permitted to pass in the second direction "B". Therefore, although a load is applied to the rotor 30, the rotor 30 is permitted to be turned in the first direction "A" at a low speed.

On the other hand, when the toilet seat 5 shown in FIG. 1 performs a turning operation in the open direction "O" from the falling-down attitude to an upright stood-up attitude, the rotor 30 is turned in the second direction "B" around the axial line "L". Therefore, the valve body 50 is turned by receiving pressure from the fluid 12 and the second end part 52 is set in an open state that the second end part 52 is moved toward a side of the first protruded part 461. In the open state, a gap space is existed between the second end part 52 of the valve body 50 and the inner peripheral face 220 of the tube part 22 of the case 20. Accordingly, the fluid 12 is passed through the gap space between the valve body 50 and the tube part 22. Therefore, even in a state that the partitioning protruded part 23 is contacted with the first peripheral face 410a of the body part 41, a large load is not applied to the rotor 30.

(Structure of First Rib 261 and the Like of Partitioning Protruded Part 23)

Figure 7A:
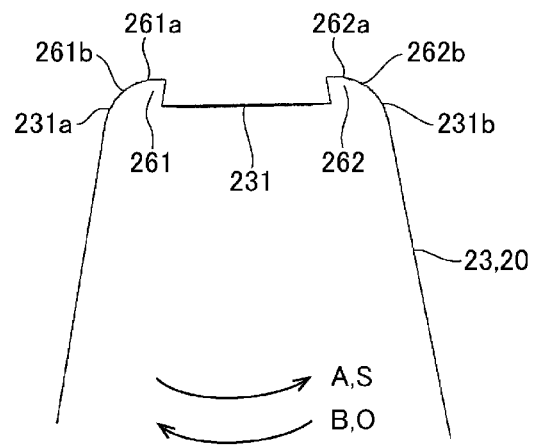
FIGS. 7A and 7B are enlarged explanatory views showing ribs which are formed in a partitioning protruded part of a case shown in FIGS. 5A and 5B.
Figure 7B:
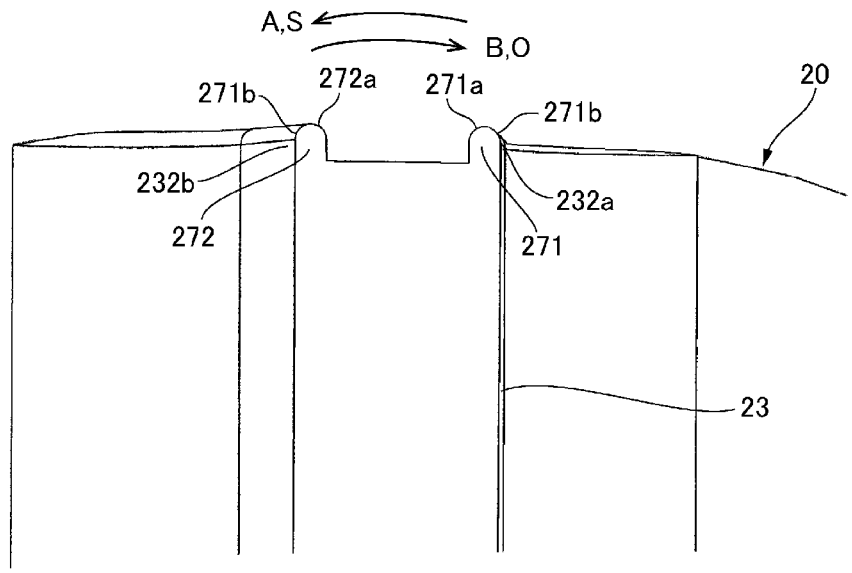

FIGS. 7A and 7B are enlarged explanatory views showing ribs functioning as squeezed margins which are formed in the partitioning protruded part 23 of the case 20 shown in FIGS. 5A and 5B. FIG. 7A is an explanatory view showing ribs which are formed in the first end face 231 of the partitioning protruded part 23 and are viewed in the axial line "L" direction. FIG. 7B is an explanatory view showing ribs which are formed in the second end face 232 of the partitioning protruded part 23 which are viewed from a side of the axial line "L".

As shown in FIG. 5B, a first rib 261 protruded toward the body part 41 of the turning shaft 40 is extended in the axial line "L" direction in the first end face 231 of the partitioning protruded part 23 of the case 20. Further, a second rib 262 protruded toward the body part 41 is extended in the axial line "L" direction in the first end face 231 at a position separated from the first rib 261 in a circumferential direction. In this embodiment, the first rib 261 is provided at an end part 231a on one side in the circumferential direction of the first end face 231 so as to extend along the end part 231a. The second rib 262 is provided at an end part 231b on the other side in the circumferential direction of the first end face 231 so as to extend along the end part 231b. In this embodiment, the first rib 261 and the second rib 262 are continuously and linearly extended from an end part of the first end face 231 on one side "L1" in the axial line "L" direction to an end part on the other side "L2" in the axial line "L" direction and are connected with the bottom wall 21.

As shown in FIG. 7A, a tip end part 261a in a protruding direction of the first rib 261 is formed so that a portion 261b on an opposite side to the second rib 262 is a curved face, and a tip end part 262a in a protruding direction of the second rib 262 is formed so that a portion 262b on an opposite side to the first rib 261 is a curved face. The first rib 261 and the second rib 262 structured as described above reduce the gap space in the radial direction between the partitioning protruded part 23 and the body part 41 of the turning shaft 40 when the fluid damper device 10 has been assembled so that a contact state of the partitioning protruded part 23 with the first peripheral face 410a of the body part 41 can be secured. Specifically, when the turning shaft 40 is turned around the axial line "L" after the fluid damper device 10 has been assembled, at least one of the first rib 261 and the second rib 262 functions as a squeezed margin which is squeezed when the partitioning protruded part 23 is contacted with the first peripheral face 410a of the outer peripheral face 410 of the body part 41 of the turning shaft 40, and a contact state in which the partitioning protruded part 23 and the first peripheral face 410a of the body part 41 of the turning shaft 40 are contacted with each other can be attained surely. In this case, when heights (protruding dimension) of the first rib 261 and the second rib 262 are too high, the tip end sides of the first rib 261 and the second rib 262 are largely squeezed and, in this squeezed state, the first rib 261 and the second rib 262 are contacted with the first peripheral face 410a of the outer peripheral face 410 of the body part 41 of the turning shaft 40. When the first rib 261 and the second rib 262 face the second peripheral face 410b of the body part 41 of the turning shaft 40, a gap space is provided between the partitioning protruded part 23 and the body part 41 of the turning shaft 40 and thus the first rib 261 and the second rib 262 do not contact with the second peripheral face 410b of the body part 41 of the turning shaft 40.

(Structure of Third Rib 271 and the Like of Partitioning Protruded Part 23)

In this embodiment, as shown in FIG. 5B, a third rib 271 protruded toward the flange part 43 of the turning shaft 40 is extended in the radial direction in the second end face 232 of the partitioning protruded part 23 of the case 20. Further, a fourth rib 272 protruded toward the flange part 43 is extended in the radial direction in the second end face 232 at a position separated in the circumferential direction from the third rib 271. In this embodiment, the third rib 271 is provided at an end part 232a on one side in the circumferential direction of the second end face 232 so as to extend along the end part 232a, and the fourth rib 272 is provided at an end part 232b on the other side in the circumferential direction of the second end face 232 so as to extend along the end part 232b. Therefore, the third rib 271 is connected with the first rib 261 and the fourth rib 272 is connected with the second rib 262. Further, an end part 232c on an inner side in the radial direction of the second end face 232 is provided with a fifth rib 270 protruded toward the flange part 43 so as to connect the third rib 271 with the fourth rib 272.

In this embodiment, as shown in FIG. 7B, a tip end part 271a in a protruding direction of the third rib 271 is formed so that a portion 271b on an opposite side to the fourth rib 272 is a curved face, and a tip end part 272a in a protruding direction of the fourth rib 272 is formed so that a portion 272b on an opposite side to the third rib 271 is a curved face.

The third rib 271 and the fourth rib 272 structured as described above reduce the gap space in the axial line "L" direction between the partitioning protruded part 23 and the flange part 43 of the turning shaft 40 when the fluid damper device 10 has been assembled to be capable of securing a contact state. Specifically, after the fluid damper device 10 has been assembled, the third rib 271 and the fourth rib 272 are contacted and squeezed as squeezed margins by the flange part 43 of the turning shaft 40 in a state that the partitioning protruded part 23 is required to be contacted with the flange part 43 of the turning shaft 40. In this case, when heights (protruding dimension) of the third rib 271 and the fourth rib 272 are too high, the tip end sides of the third rib 271 and the fourth rib 272 are largely squeezed and, in this squeezed state, the third rib 271 and the fourth rib 272 are contacted with the flange part 43 of the turning shaft 40. Further, when a height (protruding dimension) of the fifth rib 270 is too high, a tip end side of the fifth rib 270 is squeezed and, in this squeezed state, the fifth rib 270 is contacted with the flange part 43 of the turning shaft 40. Therefore, in a state that the partitioning protruded part 23 and the flange part 43 of the turning shaft 40 are required to be contacted with each other, the contact state of the partitioning protruded part 23 with the flange part 43 of the turning shaft 40 can be attained surely.

(Structure of Flange Part 43 and the Like of Turning Shaft 40)

Figure 8A:
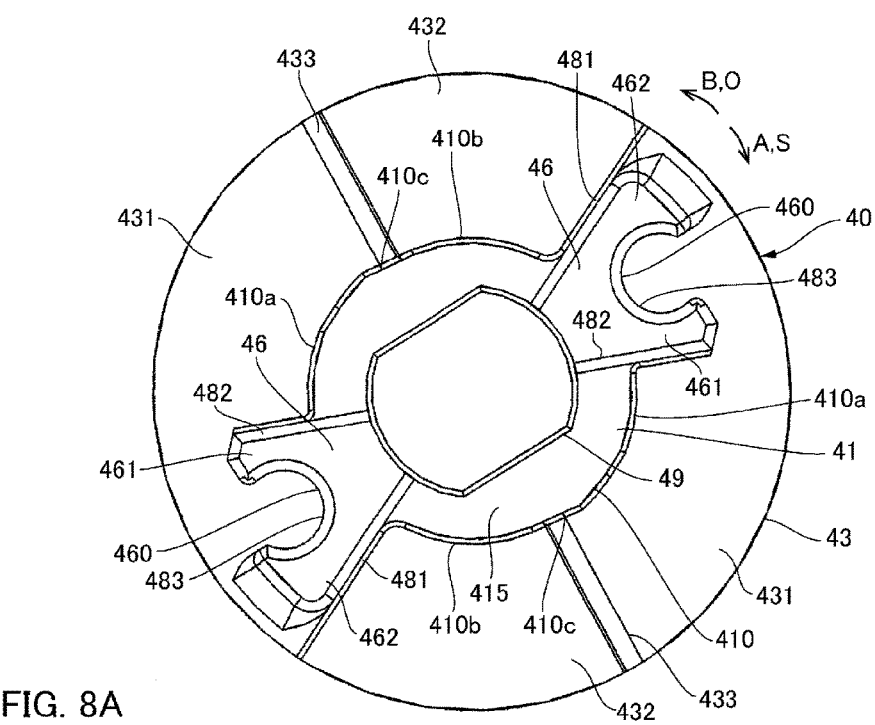
FIGS. 8A and 8B are enlarged explanatory views showing a flange part of the turning shaft shown in FIGS. 4A and 4B.
Figure 8B:
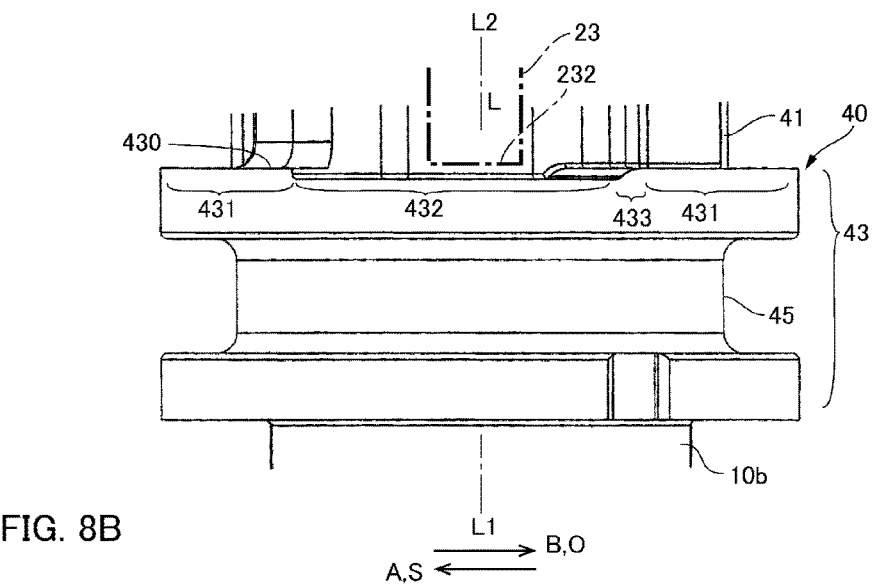

FIGS. 8A and 8B are enlarged explanatory views showing the flange part 43 of the turning shaft 40 shown in FIGS. 4A and 4B. FIG. 8A is a rear view showing the turning shaft 40 which is viewed from the other side "L2" in the axial line "L" direction and FIG. 8B is a side view showing the flange part 43.

As shown in FIGS. 4A and 4B and FIGS. 8A and 8B, a face 430 on the body part 41 side (the other side "L2" in the axial line "L" direction) of the flange part 43 of the turning shaft 40 is provided along one direction in the circumferential direction with a first region 431 capable of being contacted with the partitioning protruded part 23 and a second region 432 which enlarges a space between the second end face 232 of the partitioning protruded part 23 and the flange part 43 wider than the first region 431 so that the second end face 232 of the partitioning protruded part 23 and the flange part 43 are set in a non-contact state in this order. More specifically, when a face on the second direction "B" side of the valve body support part 46 as the reference, the first region 431 located over the angular range of about 0° through about 120° and the second region 432 located over the angular range of about 120° to 170° are provided in this order along the first direction "A" (closing direction "S") which is a turning direction of the turning shaft 40 in which the valve body 50 is set in a closed state. When viewed in a direction perpendicular to the axial line "L", the second region 432 is located on one side "L1" in the axial line "L" direction relative to the first region 431 (to the side separated from the partitioning protruded part 23). Therefore, when the partitioning protruded part 23 faces the first region 431 during turning of the turning shaft 40, the partitioning protruded part 23 is contacted with the first region 431 and, when the partitioning protruded part 23 faces the second region 432, a gap space is existed between the partitioning protruded part 23 and the second region 432. In accordance with an embodiment of the present invention, angular ranges of the first region 431 and the second region 432 are not limited to the above-mentioned values and may be appropriately set depending on the angular range occupied by the partitioning protruded part 23 and the like.

In this embodiment, the first region 431 and the second region 432 are formed in flat faces perpendicular to the axial line "L" over their angular ranges in the whole of the radial direction from the root side of the body part 41. Therefore, in the flange part 43, the whole in the radial direction over the angular range of the first region 431 is formed as the first region 431, and the whole in the radial direction over the angular range of the second region 432 is formed as the second region 432. Further, in the first region 431, a dimension between the second end face 232 of the partitioning protruded part 23 and the flange part 43 is constant in the entire circumferential direction and, in the second region 432, a gap space between the second end face 232 of the partitioning protruded part 23 and the flange part 43 is constant in the entire circumferential direction. Further, a boundary 433 between the first region 431 and the second region 432 is formed to be an inclined face or a curved face so that a distance between the second end face 232 of the partitioning protruded part 23 and the flange part 43 is continuously varied.

(Structure of Sixth Rib 481 and the Like of Turning Shaft 40)

In this embodiment, as shown in FIGS. 4A and 4B and FIG. 8A, the end face 415 on the other side "L2" in the axial line "L" direction of the turning shaft 40 is formed with a sixth rib 481 which is protruded toward the bottom wall 21 of the case 20 and is extended in the radial direction. In this embodiment, the sixth rib 481 is continuously formed from a root of the end part 49 to an end part on an outer side in the radial direction of the second protruded part 462 of the valve body support part 46. Further, the end face 415 on the other side "L2" in the axial line "L" direction of the turning shaft 40 is formed with a seventh rib 482 which is protruded toward the bottom wall 21 and is extended in the radial direction at a position separated from the sixth rib 481 in the circumferential direction. In this embodiment, the seventh rib 482 is continuously formed from the root of the end part 49 to an end part on an outer side in the radial direction of the first protruded part 461 of the valve body support part 46. Further, the end face 415 on the other side "L2" in the axial line "L" direction of the turning shaft 40 is formed with an eighth rib 483 which connects an end part on an outer side in the radial direction of the sixth rib 481 with an end part on an outer side in the radial direction of the seventh rib 482.

The sixth rib 481 is extended along an end part of the second protruded part 462 on an opposite side to the first protruded part 461, and the seventh rib 482 is extended along an end part of the first protruded part 461 on an opposite side to the second protruded part 462. The eighth rib 483 is extended along an end part on an outer side in the radial direction of the valve body support part 46. In this embodiment, tip end parts in a protruding direction of the sixth rib 481 and the seventh rib 482 are formed so that at least portions located on an outer side in the circumferential direction are formed in a curved face similarly to the third rib 271 and the fourth rib 272 described with reference to FIG. 7B.

The sixth rib 481, the seventh rib 482 and the eighth rib 483 structured as described above reduce a gap space in the axial line "L" direction between the bottom wall 21 of the case 20 and the end face 415 of the turning shaft 40 to secure a contact state when the fluid damper device 10 has been assembled. Further, in a case that heights (protruding dimension) of the sixth rib 481, the seventh rib 482 and the eighth rib 483 are too high, their tip end sides are largely squeezed and, in this squeezed state, the sixth rib 481, the seventh rib 482 and the eighth rib 483 are contacted with the bottom wall 21 of the case 20.

(Principal Effects in this Embodiment)

As described above, in the fluid damper device 10 in this embodiment, the first rib 261 protruded toward the body part 41 of the turning shaft 40 is extended in the axial line "L" direction in the first end face 231 of the partitioning protruded part 23 which is protruded from the inner peripheral face 220 of the tube part 22 of the case 20 to an inner side in the radial direction. Therefore, a dimension between the partitioning protruded part 23 and the body part 41 of the turning shaft 40 can be reduced to secure a contact state in the radial direction. Further, even in a case that a height (protruding dimension) of the first rib 261 is too high, the first rib 261 is squeezed when the fluid damper device is assembled and the first rib 261 becomes an appropriate height. Therefore, when the turning shaft 40 is turned in a closing direction "S" so that the valve body 50 is set in a closed state, a situation is hard to occur that the fluid 12 is passed through a space between the partitioning protruded part 23 and the body part 41 of the turning shaft 40 to leak in a circumferential direction. Accordingly, reduction and variation of a load generated when the turning shaft 40 is turned can be restrained.

The first end face 231 is formed with the second rib 262 which is protruded toward the body part 41 and is extended in the axial line "L" direction at a position separated in the circumferential direction from the first rib 261. Therefore, even if occurring such a situation that the tube part 22 has become an elliptical shape in cross section due to shrinkage in forming of the case 20 and that a concentric state of the case 20 with the turning shaft 40 is deviated to some extent, a dimension between the partitioning protruded part 23 and the body part 41 of the turning shaft 40 can be reduced to secure a contact state by either of the first rib 261 and the second rib 262. Accordingly, even if occurring such a situation that a concentric state of the case 20 with the turning shaft 40 is deviated to some extent, when the turning shaft 40 is turned in the closing direction "S", a situation is hard to occur that the fluid 12 is passed through a space between the partitioning protruded part 23 and the body part 41 of the turning shaft 40 to leak in a circumferential direction. Therefore, reduction and variation of a load generated when the turning shaft 40 is turned can be restrained.

The first rib 261 and the second rib 262 are respectively provided at the end parts 231a and 231b on both sides in the circumferential direction of the first end face 231. Therefore, even if occurring such a situation that a concentric state of the case 20 with the turning shaft 40 is deviated to some extent, a dimension between the partitioning protruded part 23 and the body part 41 of the turning shaft 40 can be reduced by either of the first rib 261 and the second rib 262 and the contact state can be easily secured.

The first rib 261 and the second rib 262 are continuously extended from an end part on one side "L1" in the axial line "L" direction of the first end face 231 to an end part on the other side "L2" and thus a dimension between the partitioning protruded part 23 and the body part 41 of the turning shaft 40 can be reduced over the whole in the axial line "L" direction and a contact state can be secured. Further, the portion 261b of the tip end part 261a in a protruding direction of the first rib 261 which is located on an opposite side to the second rib 262 is formed to be a curved face, and the portion 262b of the tip end part 262a in a protruding direction of the second rib 262 which is located on an opposite side to the first rib 261 is formed to be a curved face. Therefore, even when the turning shaft 40 is turned in any direction, a situation is hard to occur that the first rib 261 and the second rib 262 are caught by the body part 41 of the turning shaft 40.

The second end face 232 of the partitioning protruded part 23 is provided with the third rib 271 which is protruded toward the flange part 43 of the turning shaft 40 and is extended in the radial direction. Therefore, a dimension between the partitioning protruded part 23 and the flange part 43 of the turning shaft 40 is reduced in the axial line "L" direction and the contact state can be secured. Further, in a case that the height (protruding dimension) of the third rib 271 is too high, the third rib 271 is largely squeezed when the fluid damper device 10 is assembled and the height of the third rib 271 becomes appropriate. Therefore, when the turning shaft 40 is turned in the closing direction "S" so that the valve body 50 is set in a closed state, a situation is hard to occur that the fluid 12 is passed through a space between the partitioning protruded part 23 and the flange part 43 of the turning shaft 40 to leak in the circumferential direction. Accordingly, reduction and variation of a load generated when the turning shaft 40 is turned can be restrained.

The second end face 232 is provided with the fourth rib 272 which is protruded toward the flange part 43 and is extended in the radial direction at a position separated in the circumferential direction from the third rib 271. Therefore, even if occurring a situation that accuracy of a shape of the flange part 43 is low to some extent, a dimension between the partitioning protruded part 23 and the flange part 43 of the turning shaft 40 is reduced by either of the third rib 271 and the fourth rib 272 and the contact state can be secured. Accordingly, even if occurring a situation that accuracy of a shape of the flange part 43 is low to some extent, when the turning shaft 40 is turned in the closing direction "S", a situation is hard to occur that the fluid 12 is passed through a space between the partitioning protruded part 23 and the flange part 43 of the turning shaft 40 to leak in the circumferential direction. Therefore, reduction and variation of a load generated when the turning shaft 40 is turned can be restrained.

The third rib 271 and the fourth rib 272 are provided at the end parts 232$a$ and 232$b$ on both sides in the circumferential direction of the second end face 232. Therefore, even if occurring a situation that accuracy of a shape of the flange part 43 is low to some extent, a space between the partitioning protruded part 23 and the flange part 43 of the turning shaft 40 is reduced by either of the third rib 271 and the fourth rib 272 and the contact state can be easily secured.

The tip end part 271$a$ in a protruding direction of the third rib 271 is formed so that the portion 271$b$ on an opposite side to the fourth rib 272 is formed to be a curved face, and the tip end part 262$a$ in a protruding direction of the fourth rib 272 is formed so that the portion 272$b$ on an opposite side to the third rib 271 is formed to be a curved face. Therefore, even when the turning shaft 40 is turned in any direction, a situation is hard to occur that the third rib 271 and the fourth rib 272 are caught by the flange part 43 of the turning shaft 40.

The third rib 271 is connected with the first rib 261 and the fourth rib 272 is connected with the second rib 262 and thus the fluid 12 can be restrained from leaking from a space between the first rib 261 and the third rib 271 and a space between the second rib 262 and the fourth rib 272. Therefore, reduction and variation of a load generated when the turning shaft 40 is turned can be restrained. Further, an end part on an inner side in the radial direction of the second end face 232 is provided with the fifth rib 270 protruded toward the flange part 43 so as to connect the third rib 271 with the fourth rib 272. Therefore, the fluid 12 can be restrained from leaking out at the end part of the third rib 271 and the end part of the fourth rib 272.

The end face 415 on the other side "L2" in the axial line "L" direction of the turning shaft 40 is provided with the sixth rib 481 which is protruded toward the bottom wall 21 of the case 20 and is extended in the radial direction. Therefore, a dimension between the bottom wall 21 of the case 20 and the end face 415 of the turning shaft 40 is reduced in the axial line "L" direction and the contact state can be secured. Further, even in a case that the height (protruding dimension) of the sixth rib 481 is too high, when the fluid damper device 10 is assembled, the sixth rib 481 is largely squeezed and the height of the sixth rib 481 becomes appropriate. Therefore, when the turning shaft 40 is turned in the closing direction "S" in which the valve body 50 is set in a closed state, a situation is hard to occur that the fluid 12 is passed through a space between the bottom wall 21 of the case 20 and the end face 415 of the turning shaft 40 to leak in the circumferential direction. Accordingly, reduction and variation of a load generated when the turning shaft 40 is turned can be restrained.

The end face 415 on the other side "L2" in the axial line "L" direction of the turning shaft 40 is provided with the seventh rib 482 which is protruded toward the bottom wall 21 and is extended in the radial direction at a position separated in the circumferential direction from the sixth rib 481. Therefore, even if occurring a situation that accuracy of a shape of the bottom wall 21 is low to some extent, the space between the bottom wall 21 and the end face 415 of the turning shaft 40 can be reduced by either of the sixth rib 481 and the seventh rib 482 and the contact state can be secured. Accordingly, even if occurring a situation that accuracy of a shape of the bottom wall 21 is low to some extent, when the turning shaft 40 is turned in the closing direction "S", a situation is hard to occur that the fluid 12 is passed through a space between the bottom wall 21 and the end face 415 of the turning shaft 40 to leak in the circumferential direction. Therefore, reduction and variation of a load generated when the turning shaft 40 is turned can be restrained.

In the fluid damper device 10 in this embodiment, the face 430 on the body part 41 side of the flange part 43 is provided with the first region 431 configured to contact with the partitioning protruded part 23 and the second region 432 in which a distance between the partitioning protruded part 23 and the flange part 43 are set to be wider than that of the first region 431 in this order along one direction (closing direction "S") in the circumferential direction. Therefore, even in a case that a distance between the partitioning protruded part 23 and the flange part 43 is reduced by the third rib 271 and the like, when the turning shaft 40 is turned and passed through the position where the partitioning protruded part 23 faces the second region 432, sliding resistance occurred between the partitioning protruded part 23 and the flange part 43 of the turning shaft 40 can be reduced. Accordingly, an occurrence of a situation that an unnecessary load is applied to the turning shaft 40 due to sliding resistance can be restrained, and an occurrence of a situation that wear is occurred in a sliding portion between the case 20 and the turning shaft 40 (the flange part 43 and the second end face 232 of the partitioning protruded part 23) due to sliding resistance can be restrained.

The second region 432 configured to reduce sliding resistance is provided in a part of the region in the circumferential direction. Therefore, in the turnable range of the turning shaft 40, the first region 431 can be provided over an angular range where a load is required to apply to the turning shaft 40, and the second region 432 can be provided over an angular range where a load is not required to apply to the turning shaft 40. Accordingly, damper performance of the fluid damper device 10 is not deteriorated.

In this embodiment, the flange part 43 is provided with the first region 431 and the second region 432 in this order along the first direction "A" (closing direction "S"). Therefore, when the toilet seat 5 begins to fall down in the closing direction "S" from the attitude that the toilet seat 5 is stood up, a moment applied to the toilet seat 5 by its own weight is small but, during this period, the partitioning protruded part 23 is passed through the second region 432 and thus a sliding resistance between the partitioning protruded part 23 and the flange part 43 is small or is hardly generated. Accordingly, a falling-down speed of the toilet seat 5 in an early period when the toilet seat 5 begins to fall down in the closing direction "S" from the stood-up attitude can be increased. As a result, the moving speed of the toilet seat 5 by its own weight can be substantially constant while the toilet seat 5 is moved from a stood-up attitude to a falling-down attitude.

In the angular range of the flange part 43 in which the second region 432 is provided, the second region 432 is provided over the whole area in the radial direction and thus sliding resistance when the partitioning protruded part 23 is passed through the position facing the second region 432 can be reduced largely. Further, the boundary 433 between the first region 431 and the second region 432 is formed to be an inclined face or a curved face in which a distance between the second end face 232 and the flange part 43 is continuously varied and thus occurrence of a situation that the partitioning protruded part 23 is caught by the boundary between the first region 431 and the second region 432 can be restrained.

The outer peripheral face 410 of the body part 41 of the turning shaft 40 is provided with the first peripheral face 410a and the second peripheral face 410b whose radius is smaller than that of the first peripheral face 410a in this order along one direction in the circumferential direction. Therefore, when the turning shaft 40 is turned and passed through the position where the partitioning protruded part 23 faces the second peripheral face 410b, sliding resistance occurred between the first end face 231 of the partitioning protruded part 23 and the outer peripheral face 410 of the body part 41 of the turning shaft 40 can be reduced. Accordingly, an occurrence of a situation that an unnecessary load is applied to the turning shaft 40 due to sliding resistance can be restrained, and an occurrence of a situation that wear is occurred in a sliding portion between the turning shaft 40 and the case 20 (the body part 41 of the turning shaft 40 and the first end face 231 of the partitioning protruded part 23) can be restrained. Further, the second peripheral face 410b configured to reduce sliding resistance is provided in a part of the region in the circumferential direction. Therefore, in the turnable range of the turning shaft 40, the first peripheral face 410a can be provided over an angular range where a load is required to apply to the turning shaft 40, and the second peripheral face 410b can be provided over an angular range where a load is not required to apply to the turning shaft 40. Accordingly, damper performance of the fluid damper device 10 is not deteriorated.

Other Embodiments

In the embodiment described above, the third rib 271, the fourth rib 272, the fifth rib 270, the sixth rib 481, the seventh rib 482 and the eighth rib 483 are provided in addition to the first rib 261 and the second rib 262. However, only the first rib 261 and the second rib 262 may be provided without providing the third rib 271, the fourth rib 272, the fifth rib 270, the sixth rib 481, the seventh rib 482 and the eighth rib 483. Further, only the first rib 261 may be provided instead of providing both of the first rib 261 and the second rib 262.

In the embodiment described above, the first region 431 and the second region 432 are provided in the flange part 43 of the fluid damper device 10 in which the ribs such as the first rib 261, the second rib 262 and the like are provided. However, the first region 431 and the second region 432 may be provided in the flange part 43 of the fluid damper device 10 in which the ribs such as the first rib 261, the second rib 262 and the like are not provided.

In the embodiment described above, in the angular ranges where the first region 431 and the second region 432 are formed, the first region 431 and the second region 432 are formed over the whole in the radial direction. However, the first region 431 and the second region 432 may be formed over a part in the radial direction. In the embodiment described above, the first region 431 and the second region 432 are formed to be perpendicular to the axial line "L". However, the second region 432 may be an inclined face which is inclined so that a distance between the partitioning protruded part 23 and the flange part 43 becomes wider according to separating from the first region 431.

In the embodiment described above, the fluid damper device 10 with which the toilet seat 5 is connected is disclosed as an example. However, at least an embodiment of the present invention may be applied to a fluid damper device 10 which is connected with a cover (swing member) which is turnably attached to a washing machine main body (apparatus main body) in a washing machine (apparatus with a damper).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A fluid damper device comprising:
    a case in a tube shape comprising a bottom wall, a tube part extended to one side in an axial line direction from the bottom wall, and a partitioning protruded part protruded to an inner side in a radial direction from an inner peripheral face of the tube part;
    a turning shaft comprising:
        a body part which faces a first end face of the partitioning protruded part that is an end face on the inner side in the radial direction; and
        a flange part which is enlarged to an outer side in the radial direction from the body part and faces a second end face of the partitioning protruded part that is an end face on one side in the axial line direction;
    a valve body which is supported on an outer side in the radial direction of the body part; and
    fluid which is filled on an inner side of the case;
    wherein a face of the flange part on a side of the body part comprises a first region structured to contact with the partitioning protruded part and a second region where a distance between the second end face and the flange part is set to be wider than a distance of the first region between the second end face and the flange part along one direction in a circumferential direction.

2. The fluid damper device according to claim 1, wherein the one direction in the circumferential direction is a turning direction of the turning shaft in which the valve body is set in a closed state.

3. The fluid damper device according to claim 1, wherein the second region is provided over a whole in the radial direction over an angular range of the second region in the flange part.

4. The fluid damper device according to claim 3, wherein
in the first region, a distance between the second end face and the flange part is constant over the whole in the circumferential direction, and
in the second region, a distance between the second end face and the flange part is constant over the whole in the circumferential direction.

5. The fluid damper device according to claim 4, wherein a boundary between the first region and the second region is formed to be an inclined face or a curved face so that a distance between the second end face and the flange part is varied continuously.

6. The fluid damper device according to claim 4, wherein the second end face comprises a rib which is protruded toward the flange part and is extended in the radial direction.

7. The fluid damper device according to claim 6, wherein the first end face comprises a rib which is protruded toward the body part and is extended in the axial line direction.

8. The fluid damper device according to claim 6, wherein an end face on the other side in the axial line direction of the turning shaft comprises a rib which is protruded toward the bottom wall and is extended in the radial direction.

9. The fluid damper device according to claim 4, wherein an outer peripheral face of the body part comprises a first peripheral face and a second peripheral face having a radius smaller than a radius of the first peripheral face in this order along one direction in the circumferential direction.

10. The fluid damper device according to claim 1, wherein a boundary between the first region and the second region is formed to be an inclined face or a curved face so that a distance between the second end face and the flange part is varied continuously.

11. The fluid damper device according to claim 10, wherein the second end face comprises a rib which is protruded toward the flange part and is extended in the radial direction.

12. An apparatus with a damper comprising:
a fluid damper device; and
a swing member which is attached to an apparatus main body through the fluid damper device;
wherein the fluid damper device comprises:
a case in a tube shape comprising a bottom wall, a tube part extended to one side in an axial line direction from the bottom wall, and a partitioning protruded part protruded to an inner side in a radial direction from an inner peripheral face of the tube part;
a turning shaft comprising:
a body part which faces a first end face of the partitioning protruded part that is an end face on the inner side in the radial direction; and
a flange part which is enlarged to an outer side in the radial direction from the body part and faces a second end face of the partitioning protruded part that is an end face on one side in the axial line direction;
a valve body which is supported on an outer side in the radial direction of the body part; and
fluid which is filled on an inner side of the case;
wherein a face of the flange part on a side of the body part comprises a first region structured to contact with the partitioning protruded part and a second region where a distance between the second end face and the flange part is set to be wider than a distance in the first region between the second end face and the flange part along one direction in a circumferential direction.

13. A Western-style toilet unit comprising:
a fluid damper device; and
a toilet seat which is attached to a toilet bowl main body through the fluid damper device;
wherein the fluid damper device comprises:
a case in a tube shape comprising a bottom wall, a tube part extended to one side in an axial line direction from the bottom wall, and a partitioning protruded part protruded to an inner side in a radial direction from an inner peripheral face of the tube part;
a turning shaft comprising:
a body part which faces a first end face of the partitioning protruded part that is an end face on the inner side in the radial direction; and
a flange part which is enlarged to an outer side in the radial direction from the body part and faces a second end face of the partitioning protruded part that is an end face on one side in the axial line direction;
a valve body which is supported on an outer side in the radial direction of the body part; and
fluid which is filled on an inner side of the case;
wherein a face of the flange part on a side of the body part comprises a first region structured to contact with the partitioning protruded part and a second region where a distance between the second end face and the flange part is set to be wider than a distance in the first region between the second end face and the flange part along one direction in a circumferential direction.

* * * * *